J. ROBERTSON.
Adjustable Journal-Boxes.

No. 150,433. Patented May 5, 1874.

Witnesses.
S. M. Poole
Edmund Masson

Inventor.
James Robertson.
By atty. A. B. Stoughton.

UNITED STATES PATENT OFFICE.

JAMES ROBERTSON, OF FLORENCE, MASSACHUSETTS, ASSIGNOR TO FLORENCE SEWING-MACHINE COMPANY, OF SAME PLACE.

IMPROVEMENT IN ADJUSTABLE JOURNAL-BOXES.

Specification forming part of Letters Patent No. 150,433, dated May 5, 1874; application filed March 27, 1874.

*To all whom it may concern:*

Be it known that I, JAMES ROBERTSON, of Florence, in the county of Hampshire and State of Massachusetts, have invented a new and useful device or mechanism for taking up lost motion in sliding boxes; and I do hereby declare the following to be a full, clear, and exact description of the same, reference being had to the accompanying drawing making a part of this specification, in which—

Figure 1:
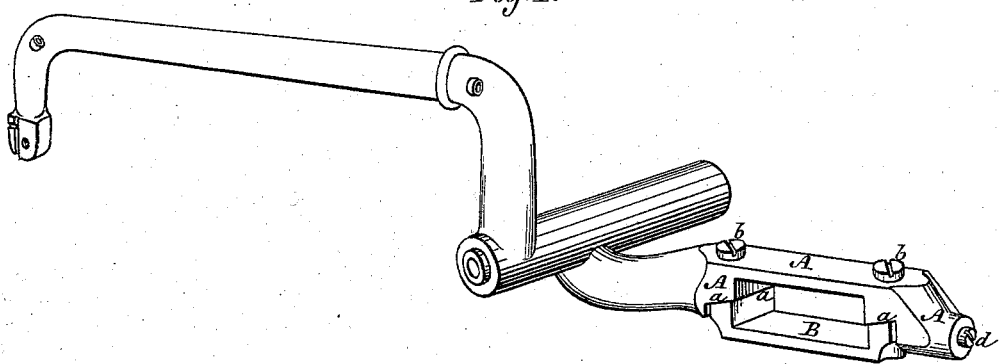
Figure 2:
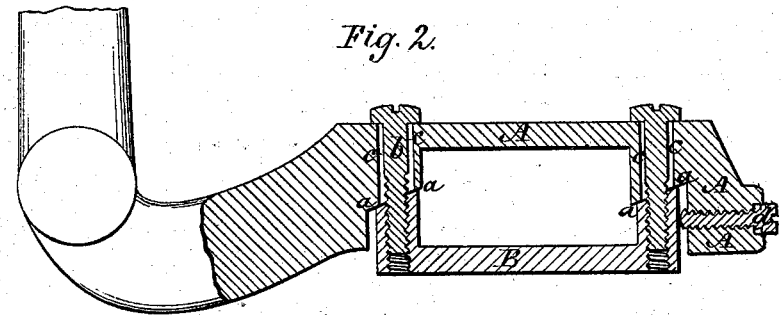

Figure 1 represents in perspective a sliding box with my device or mechanism attached. Fig. 2 represents a section through the same.

In sliding boxes or yokes in which a cam or crank is worked to cause a vibrating or reciprocating motion, the least wear or slack causes what is termed lost motion, and when the part so vibrated or reciprocated is timed with regard to other mechanism, as, for instance, in a sewing-machine, this lost motion must be taken up.

The object and purpose of my invention are to so construct the box or yoke in which a cam or crank is worked or revolved as that there shall be no slack or lost motion between said box and the cam or crank; and my invention consists in making one side of the box or yoke separate from the other side, and fitted thereto by inclined surfaces or planes, and held by screws which admit of the moving of the attached part, so as to contract or expand the space in the box through which the cam or crank revolves, and allow it to revolve in contact with both sides of the opening without any lost motion.

To enable others skilled in the art to make and use my invention, I will proceed to describe the same with reference to the drawings.

A represents the upper, and what may be termed the permanent, part of the sliding box, and B represents the movable portion thereof. The part B fits up against the part A with inclined bearing-points, as at *a a*, and the screws *b b*, passing through both parts A and B, hold them firmly together when they are properly adjusted. The screw-holes *c* through the part A are somewhat larger than the screws, so as to admit of lateral motion of the screws as the under portion B is moved. A set-screw, *d*, passing through the permanent part A of the sliding box, bears with its point against the movable portion B, so that by slacking up the screws *b b* the part B can be moved by the set-screw *d*, and adjusted with the greatest minuteness. As the part B is moved in one direction, as, for instance, by the set-screw *d*, it moves down the planes *a*, and widens the space between itself and the permanent portion A; and by backing or slacking all the screws, the movable portion can be moved the other way, which closes the space, and thus the space can be adjusted to a nicety to suit the throw or beat of the crank or cam that works in it. The movement of the adjustable portion need not be to any great extent, for the parts as originally constructed are almost perfect, and but a very slight adjustment is necessary, and this, as above stated, may be done by the set-screw *d*. The portion B can be adjusted to the cam or crank by means of the screws *b b*, the set-screw *d* having been previously slackened up, thus, by one or the other or both adjustments, making a perfect fit of box and crank or cam, and so avoid noise or jar, as well as loss of power, while the parts themselves are less liable to wear out.

Having thus fully described my invention, what I claim therein as new, and desire to secure by Letters Patent, is—

In a sliding box, the movable portion B, fitting against the permanent portion A by inclined joints *a a*, and adjusted and held thereto by the screws *b b d*, as and for the purpose described and represented.

JAMES ROBERTSON.

Witnesses:
CHAS. H. CLARK,
OLIVER EDWARDS.